US010167674B2

(12) United States Patent
Khabashesku et al.

(10) Patent No.: US 10,167,674 B2
(45) Date of Patent: Jan. 1, 2019

(54) METHODS OF FABRICATING POLYCRYSTALLINE DIAMOND BY FUNCTIONALIZING DIAMOND NANOPARTICLES, GREEN BODIES INCLUDING FUNCTIONALIZED DIAMOND NANOPARTICLES, AND METHODS OF FORMING POLYCRYSTALLINE DIAMOND CUTTING ELEMENTS

(71) Applicant: Baker Hughes Incorporated, Houston, TX (US)

(72) Inventors: Valery N. Khabashesku, Houston, TX (US); Anthony A. DiGiovanni, Houston, TX (US); Gaurav Agrawal, Aurora, CO (US)

(73) Assignee: BAKER HUGHES INCORPORATED, Houston, TX (US)

( * ) Notice: Subject to any disclaimer, the term of this patent is extended or adjusted under 35 U.S.C. 154(b) by 661 days.

(21) Appl. No.: 13/782,341

(22) Filed: Mar. 1, 2013

(65) Prior Publication Data

US 2014/0246250 A1    Sep. 4, 2014

(51) Int. Cl.
*E21B 10/567* (2006.01)
*B24D 18/00* (2006.01)
(Continued)

(52) U.S. Cl.
CPC ............. *E21B 10/567* (2013.01); *B01J 3/062* (2013.01); *B24D 18/0009* (2013.01);
(Continued)

(58) Field of Classification Search
None
See application file for complete search history.

(56) References Cited

U.S. PATENT DOCUMENTS 7,820,130 B2 * 10/2010 Khabashesku ........ C01B 31/065
423/446
2002/0194955 A1 * 12/2002 Fang .................... C09K 3/1418
75/240
(Continued)

FOREIGN PATENT DOCUMENTS

JP          09157024 A      6/1997

OTHER PUBLICATIONS

Conversion of Percentage by Volume to Percentage by Weight of mixture of cobalt, diamond and polyethylene (using PE density high endpoint value). Handymath.com (Nov. 3, 2017).*
(Continued)

*Primary Examiner* — Colleen P Dunn
*Assistant Examiner* — Ross J Christie
(74) *Attorney, Agent, or Firm* — TraskBritt

(57) ABSTRACT

Method of fabricating polycrystalline diamond include functionalizing surfaces of diamond nanoparticles with fluorine, combining the functionalized diamond nanoparticles with a polymer to form a mixture, and subjecting the mixture to high pressure and high temperature (HPHT) conditions to form inter-granular bonds between the diamond nanoparticles. A green body includes a plurality of diamond nanoparticles functionalized with fluorine, and a polymer material interspersed with the plurality of diamond nanoparticles. A method of forming cutting element includes functionalizing surfaces of diamond nanoparticles with fluorine, and combining the functionalized diamond nanoparticles with a polymer to form a mixture. The mixture is formed over a body, and the mixture and the body are subjected to HPHT conditions to form inter-granular bonds between the diamond nanoparticles and secure the bonded diamond nanoparticles to the body.

18 Claims, 4 Drawing Sheets

(51) Int. Cl.

| | |
|---|---|
| *B24D 99/00* | (2010.01) |
| *C04B 35/532* | (2006.01) |
| *C04B 35/622* | (2006.01) |
| *C04B 35/626* | (2006.01) |
| *C04B 35/628* | (2006.01) |
| *C04B 35/645* | (2006.01) |
| *B01J 3/06* | (2006.01) |
| *C01B 32/25* | (2017.01) |

(52) U.S. Cl.
CPC ............ *B24D 99/005* (2013.01); *C01B 32/25* (2017.08); *C04B 35/532* (2013.01); *C04B 35/6268* (2013.01); *C04B 35/62218* (2013.01); *C04B 35/62802* (2013.01); *C04B 35/62884* (2013.01); *C04B 35/645* (2013.01); *B01J 2203/062* (2013.01); *B01J 2203/0655* (2013.01); *B01J 2203/0685* (2013.01); *C04B 2235/427* (2013.01); *C04B 2235/48* (2013.01); *C04B 2235/5436* (2013.01); *C04B 2235/5445* (2013.01); *C04B 2235/5454* (2013.01); *C04B 2235/5472* (2013.01); *C04B 2235/6021* (2013.01); *C04B 2235/94* (2013.01); *C04B 2235/95* (2013.01)

(56) References Cited

U.S. PATENT DOCUMENTS

| | | | |
|---|---|---|---|
| 2004/0121070 A1* | 6/2004 | Xu | C01B 31/06 427/212 |
| 2005/0158549 A1* | 7/2005 | Khabashesku et al. | 428/403 |
| 2006/0191722 A1* | 8/2006 | Belnap et al. | 175/374 |
| 2007/0193782 A1 | 8/2007 | Fang et al. | |
| 2007/0272448 A1* | 11/2007 | Griffo | B22F 1/004 175/426 |
| 2008/0073126 A1* | 3/2008 | Shen | E21B 10/567 175/434 |
| 2009/0218146 A1* | 9/2009 | Fang | B22F 7/062 51/297 |
| 2010/0285304 A1* | 11/2010 | Wu | C09D 127/12 428/323 |
| 2011/0124541 A1 | 5/2011 | Yao | |
| 2011/0252712 A1* | 10/2011 | Chakraborty | B01J 3/062 51/298 |
| 2012/0034464 A1* | 2/2012 | Chakraborty et al. | 428/402 |
| 2012/0037431 A1 | 2/2012 | DiGiovanni et al. | |
| 2013/0000209 A1* | 1/2013 | Chakraborty | B01J 3/062 51/298 |

OTHER PUBLICATIONS

Conversion of Percentage by Volume to Percentage by Weight of mixture of cobalt, diamond and polyethylene (using PE density low endpoint value). Handymath.com (Nov. 3, 2017).*

Conversion of Percentage by Weight to Percentage by Volume of mixture of cobalt and diamond. Handymath.com (Nov. 3, 2017).*

International Search Report for International Application No. PCT/US2014/019432 dated Jun. 23, 2014, 3 pages.

International Written Opinion for International Application No. PCT/US2014/019432 dated Jun. 23, 2014, 8 pages.

Liu et al., Functionalization of Nanoscale Diamond Powder: Fluoro-, Alkyl-, Amino-, and Amino Acid-Nanodiamond Derivatives, Chem. Mater. vol. 16, (2004), pp. 3924-3930.

Davydov et al., Synergistic Effect of Fluorine and Hydrogen on Processes of Graphite and Diamond Formation from Fluorographite-Naphthalene Mixtures at High Pressures, The Journal of Physical Chemistry, vol. 115 (2011) pp. 21000-21008.

Pulikkathara et al., Medium Density Polyethylene Composites with Functionalized Carbon Nanotubes, Nanotechnology vol. 20 (2009) 13 pages.

Rangari et al., Alignment of Carbon Nanotubes and Reinforcing Effects in Cylon-6 Polymer Composite Fibers, Nanotechnology vol. 19 (2008) 9 pages.

Underwood, Quantitative Stereology, 103-105 (Addison-Wesley Publishing Company, Inc., 1970), 20 pages.

International Preliminary Report on Patentability for International Application No. PCT/US2014/019432 dated Sep. 1, 2015, 9 pages.

The First Office Action of Chinese Application No. 2014800116913, dated Aug. 2, 2016, 20 pages.

First Search of Chinese Application No. 2014800116913, dated Jul. 20, 2016, 2 pages.

Supplementary European Search Report and Search Opinion for European Patent Application No. EP14757457, dated Sep. 21, 2016, 5 pages.

Extended European Search Report for European Appplication No. 17187464.7 dated Nov. 21, 2017, 8 pages.

Chinese Second Office Action for Chinese Application No. 201480011691.3 dated Apr. 13, 2017, 6 pages.

* cited by examiner

METHODS OF FABRICATING POLYCRYSTALLINE DIAMOND BY FUNCTIONALIZING DIAMOND NANOPARTICLES, GREEN BODIES INCLUDING FUNCTIONALIZED DIAMOND NANOPARTICLES, AND METHODS OF FORMING POLYCRYSTALLINE DIAMOND CUTTING ELEMENTS

FIELD

Embodiments of the present invention relate generally to methods of forming polycrystalline diamond material, methods of forming cutting elements including polycrystalline diamond material, and green bodies that may be used to form such cutting elements.

BACKGROUND

Earth-boring tools for forming wellbores in subterranean earth formations may include a plurality of cutting elements secured to a body. For example, fixed-cutter earth-boring rotary drill bits (also referred to as "drag bits") include a plurality of cutting elements fixedly attached to a bit body of the drill bit. Similarly, roller cone earth-boring rotary drill bits include cones mounted on bearing pins extending from legs of a bit body such that each cone is capable of rotating about the bearing pin on which the cone is mounted. A plurality of cutting elements may be mounted to each cone of the drill bit.

The cutting elements used in such earth-boring tools often include polycrystalline diamond cutters (often referred to as "PDCs"), which are cutting elements that include a polycrystalline diamond (PCD) material. Such polycrystalline diamond cutting elements are formed by sintering and bonding together relatively small diamond grains or crystals under conditions of high temperature and high pressure in the presence of a catalyst (such as cobalt, iron, nickel, or alloys and mixtures thereof) to form a layer of polycrystalline diamond material on a cutting element substrate. These processes are often referred to as "high pressure, high temperature" (or "HPHT") processes. The cutting element substrate may be a cermet material (i.e., a ceramic-metal composite material) such as cobalt-cemented tungsten carbide. In such instances, the cobalt or other catalyst material in the cutting element substrate may be drawn into the diamond grains or crystals during sintering and serve as a catalyst material for forming a diamond table from the diamond grains or crystals. In other methods, powdered catalyst material may be mixed with the diamond grains or crystals prior to sintering the grains or crystals together in an HPHT process.

Cobalt, which is commonly used in sintering processes to form PCD material, melts at about 1495° C. The melting temperature may be reduced by alloying cobalt with carbon or another element, so HPHT sintering of cobalt-containing bodies may be performed at temperatures above about 1450° C.

Upon formation of a diamond table using an HPHT process, catalyst material may remain in interstitial spaces between the grains or crystals of diamond in the resulting polycrystalline diamond table. The presence of the catalyst material in the diamond table may contribute to thermal damage in the diamond table when the cutting element is heated during use, due to friction at the contact point between the cutting element and the formation. Polycrystalline diamond cutting elements in which the catalyst material remains in the diamond table are generally thermally stable up to temperatures of about 750° C., although internal stress within the polycrystalline diamond table may begin to develop at temperatures exceeding about 350° C. This internal stress is at least partially due to differences in the rates of thermal expansion between the diamond table and the cutting element substrate to which it is bonded. This differential in thermal expansion rates may result in relatively large compressive and tensile stresses at the interface between the diamond table and the substrate, and may cause the diamond table to delaminate from the substrate. At temperatures of about 750° C. and above, stresses within the diamond table may increase significantly due to differences in the coefficients of thermal expansion of the diamond material and the catalyst material within the diamond table itself. For example, cobalt thermally expands significantly faster than diamond, which may cause cracks to form and propagate within a diamond table including cobalt, eventually leading to deterioration of the diamond table and ineffectiveness of the cutting element.

To reduce the problems associated with different rates of thermal expansion in polycrystalline diamond cutting elements, so-called "thermally stable" polycrystalline diamond (TSD) cutting elements have been developed. Such a thermally stable polycrystalline diamond cutting element may be formed by leaching the catalyst material (e.g., cobalt) out from interstitial spaces between the diamond grains in the diamond table using, for example, an acid. All of the catalyst material may be removed from the diamond table, or only a portion may be removed. Thermally stable polycrystalline diamond cutting elements in which substantially all catalyst material has been leached from the diamond table have been reported to be thermally stable up to temperatures of about 1200° C. It has also been reported, however, that fully leached diamond tables are relatively more brittle and vulnerable to shear, compressive, and tensile stresses than are non-leached diamond tables. In an effort to provide cutting elements having diamond tables that are more thermally stable relative to non-leached diamond tables, but that are also relatively less brittle and vulnerable to shear, compressive, and tensile stresses relative to fully leached diamond tables, cutting elements have been provided that include a diamond table in which only a portion of the catalyst material has been leached from the diamond table.

BRIEF SUMMARY

In some embodiments, a method of fabricating polycrystalline diamond includes functionalizing surfaces of diamond nanoparticles with fluorine, combining the functionalized diamond nanoparticles with a polymer to form a mixture, and subjecting the mixture to high pressure and high temperature (HPHT) conditions to form inter-granular bonds between the diamond nanoparticles.

In certain embodiments, a green body includes a plurality of diamond nanoparticles functionalized with fluorine and a polymer material interspersed with the plurality of diamond nanoparticles.

In other embodiments, a method of forming cutting elements includes functionalizing surfaces of diamond nanoparticles with fluorine, and combining the functionalized diamond nanoparticles with a polymer to form a mixture. The mixture is provided over a body, and the mixture and the body are subjected to HPHT conditions to form inter-granular bonds between the diamond nanoparticles and secure the bonded diamond nanoparticles to the body.

DETAILED DESCRIPTION

Figure 1:
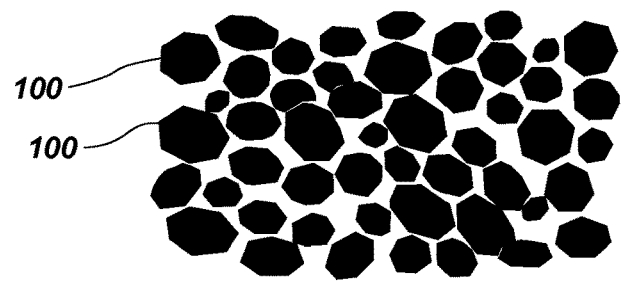
FIG. 1 is a simplified view illustrating diamond nanoparticles.

The illustrations presented herein are not meant to be actual views of any particular material, apparatus, system, or method, but are merely idealized representations employed to describe certain embodiments. For clarity in description, various features and elements common among the embodiments may be referenced with the same or similar reference numerals.

As used herein, the term "drill bit" means and includes any type of bit or tool used for drilling during the formation or enlargement of a wellbore and includes, for example, rotary drill bits, percussion bits, core bits, eccentric bits, bicenter bits, reamers, expandable reamers, mills, drag bits, roller cone bits, hybrid bits, and other drilling bits and tools known in the art.

The term "polycrystalline material" means and includes any material comprising a plurality of grains (i.e., crystals) of the material that are bonded directly together by inter-granular bonds. The crystal structures of the individual grains of the material may be randomly oriented in space within the polycrystalline material.

As used herein, the term "inter-granular bond" means and includes any direct atomic bond (e.g., ionic, covalent, metallic, etc.) between atoms in adjacent grains of material.

As used herein, the term "grain size" means and includes a geometric mean diameter measured from a two-dimensional section through a bulk material. The geometric mean diameter for a group of particles may be determined using techniques known in the art, such as those set forth in Ervin E. Underwood, QUANTITATIVE STEREOLOGY, 103-105 (Addison-Wesley Publishing Company, Inc., 1970), the disclosure of which is incorporated herein in its entirety by this reference.

FIG. 1 is a simplified view illustrating diamond nanoparticles 100. Diamond nanoparticles 100 may be formed by chemical vapor deposition, detonation synthesis, mechanical attrition, or any other methods. The diamond nanoparticles 100 may have any selected size distribution, which may be monomodal or multimodal (bimodal, trimodal, etc.). The diamond nanoparticles 100 may have a mean diameter from about 1 nm (nanometer) to about 150 nm, from about 1 nm to about 20 nm, from about 20 nm to about 50 nm, from about 50 nm to about 100 nm, or even from about 100 nm to about 150 nm. In some embodiments, the diamond nanoparticles may have a mean diameter from about 2 nm to about 10 nm. For example, the diamond nanoparticles 100 may have a mean diameter from about 4 nm to 5 nm. It has been observed that such diamond nanoparticles 100 may self-organize into primary aggregates from about 20 nm to about 30 nm in size, which may in turn form larger weakly bonded secondary aggregates ranging in size from hundreds of nanometers to micrometers.

Figure 2:
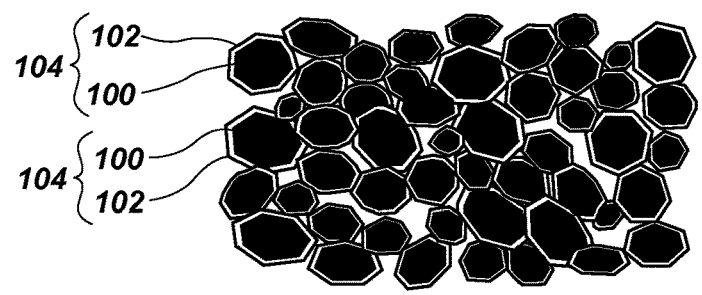
FIG. 2 is a simplified view illustrating the diamond nanoparticles of FIG. 1 after functionalization with fluorine.

The diamond nanoparticles 100 may be functionalized with fluorine. FIG. 2 is a simplified view illustrating functionalized diamond nanoparticles 104. The functionalized diamond nanoparticles 104 include a fluorine coating 102 over at least a portion of the diamond nanoparticles 100.

The fluorine coating 102 may be formed by contacting the diamond nanoparticles 100 with fluorine gas ($F_2$) at elevated temperatures (e.g., from about 50° C. to about 500° C.), as described in U.S. Pat. No. 7,820,130, issued Oct. 26, 2010, titled "Functionalization of Nanodiamond Powder Through Fluorination and Subsequent Derivatization Reactions," the entire disclosure of which is hereby incorporated by reference. The fluorine atoms of the fluorine coating 102 may be covalently bonded to carbon atoms of the diamond nanoparticles 100. The fluorine coating 102 may be a monolayer over the diamond nanoparticles 100. The amount of fluorine in the functionalized diamond nanoparticles 104 may be a function of the mean diameter of the diamond nanoparticles 100. For example, if the fluorine coating 102 has a given thickness (e.g., one monolayer), smaller functionalized diamond nanoparticles 104 will have a higher concentration of fluorine than larger functionalized diamond nanoparticles 104. The functionalized diamond nanoparticles 104 may include, for example, from about 1% to about 30% fluorine by weight, such as from about 5% to about 20% fluorine by weight. In some embodiments, the functionalized diamond nanoparticles 104 may include about 15% fluorine by weight.

Figure 3:
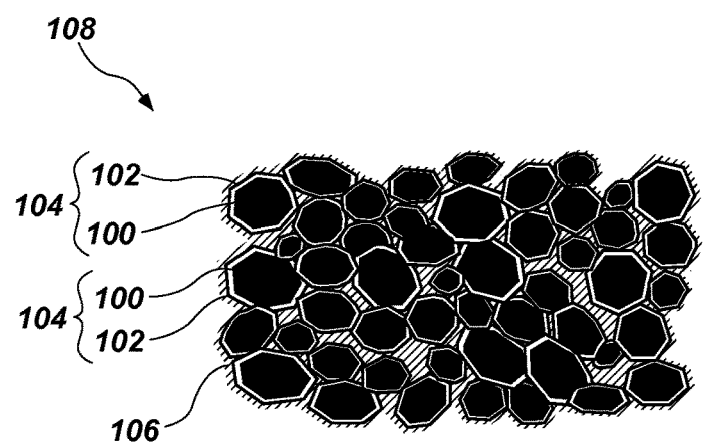
FIG. 3 is a simplified view illustrating the functionalized diamond nanoparticles of FIG. 2 mixed with a polymer.

As shown in FIG. 3, the functionalized diamond nanoparticles 104 may be combined with a polymer 106 to form a mixture 108, such that, upon sintering, the polymer 106 promotes the formation of inter-granular diamond-to-diamond bonds. The polymer 106 may include a material such as polyethylene (PE), polypropylene (PP), polystyrene (PS), polyacrylonitrile (PAN), polybutadiene (PBD), polybutylene (PB), acrylonitrile butadiene styrene (ABS), polycarbosilane (PCS) etc. The polymer 106 may be selected to be free of oxygen. During subsequent sintering, oxygen may cause oxidation of carbon, weakening bonding. The polymer 106 may be selected to include primarily C—H single, double, or aromatic bonds (e.g., as in PE, PP, and PS). The polymer 106 may also include other elements that do not tend to interfere with the formation of diamond-to-diamond bonds, such as nitrogen and silicon. The polymer 106 may be, for example, a thermoplastic polymer or a thermosetting polymer. The polymer 106 may be mixed with the functionalized diamond nanoparticles 104 as a liquid (e.g., in a molten state, in the case of thermoplastics) or a solid. For example, the polymer 106 may be mixed with the functionalized diamond nanoparticles 104 at a temperature at which the polymer 106 is a liquid. The polymer 106 may be subsequently cooled and solidified, such as to form the mixture 108 into a cohesive solid. The mixture 108 may then be an unsintered body, but may nonetheless retain a shape.

Thus, the mixture 108 may be extruded, pressed, milled, formed into a mold, etc. In some embodiments, the mixture 108 may be ground into a powder, and the powder then may be extruded, pressed, molded (e.g., injection molded), spray dried, spin coated, hot or cold rolled, tape cast, etc.

In some embodiments, the polymer 106 may be added to the functionalized diamond nanoparticles 104 as a solid. For example, the polymer 106 may be a powder or pelletized material, and may be mechanically mixed with the functionalized diamond nanoparticles 104. In some embodiments, the polymer 106 and the functionalized diamond nanoparticles 104 may be commingled powders. The mixture 108 may be heated to soften or liquefy the polymer 106 and promote formation of the mixture 108 into a selected shape.

The mixture 108 may include from about 0.1% to about 20% polymer 106 by weight (i.e., from about 80% to about 99.9% functionalized diamond nanoparticles 104 by weight). For example, the mixture 108 may include from about 0.5% to about 10% polymer 106 by weight (i.e., from about 90% to about 99.5% functionalized diamond nanoparticles 104 by weight), or about 1.0% to about 5.0% polymer 106 by weight (i.e., from about 95% to about 99% functionalized diamond nanoparticles 104 by weight). The amount of the polymer 106 mixed with the functionalized diamond nanoparticles 104 may be selected to have a volume approximately equal to the volume of interstitial spaces between the functionalized diamond nanoparticles 104, such that the polymer 106 approximately fills the interstitial spaces. For example, the volume of the polymer 106 may be from about 50% to about 150% of the volume of the interstitial spaces, or from about 90% to about 110% of the volume of the interstitial spaces.

In some embodiments, the mixture 108 may include from about 0.1% to about 50% polymer 106 by weight. For example, the mixture 108 may include from about 0.5% to about 20% polymer 106 by weight, or about 1.0% to about 10% polymer 106 by weight. The amount of the polymer 106 mixed with the functionalized diamond nanoparticles 104 may be selected to have a volume approximately equal to the volume of interstitial spaces between the functionalized diamond nanoparticles 104, such that the polymer 106 approximately fills the interstitial spaces. For example, the volume of the polymer 106 may be from about 50% to about 150% of the volume of the interstitial spaces, or from about 90% to about 110% of the volume of the interstitial spaces.

Figure 4:
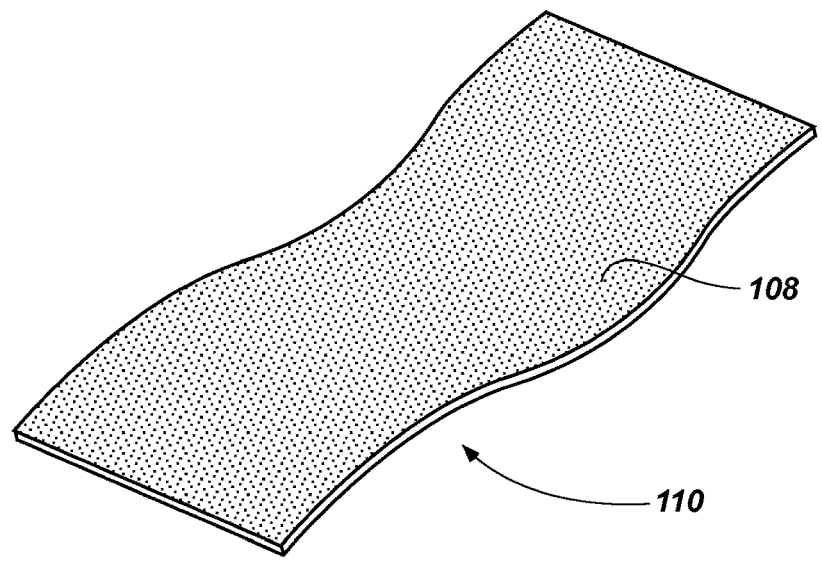
FIG. 4 is a simplified view illustrating a sheet of material including the functionalized diamond nanoparticles and the polymer of FIG. 3.

As shown in FIG. 4, the mixture 108 may be formed into sheets 110, such as by extrusion or by pressing between rollers (which may be referred to in the art as roll milling). For example, extrusion may be performed as described in Vijaya K. Rangari et al., "Alignment of Carbon Nanotubes and Reinforcing Effects in Nylon-6 Polymer Composite Fibers," 19 Nanotechnology 245703 (IOP Publishing, 2008), the entire disclosure of which is hereby incorporated by reference. The sheets 110 may include the functionalized diamond nanoparticles 104 and the polymer 106. The sheets 110 may each be green (unsintered) bodies, and may be used to fabricate other green bodies, such as by layering sheets 110 over one another to form a stack of the sheets 110. The sheets 110 may be formed having any selected length, width, and thickness. For example, the sheets 110 may have a thickness from about 0.1 mm to about 10 mm, such as from about 0.5 mm to about 2 mm. The sheets 110 may have the same composition, or may have different compositions. For example, the sheets 110 may be as described in U.S. Patent Application Publication No. 2012/0037431, published Feb. 16, 2012, and titled "Cutting Elements Including Nanoparticles in at Least One Portion Thereof, Earth Boring Tools Including Such Cutting Elements, and Related Methods," the entire disclosure of which is incorporated herein by reference. The sheets 110 may include functionalized diamond nanoparticles 104 of different average grain sizes, or may have different amounts of the functionalized diamond nanoparticles 104 or the polymer 106.

Figure 5:
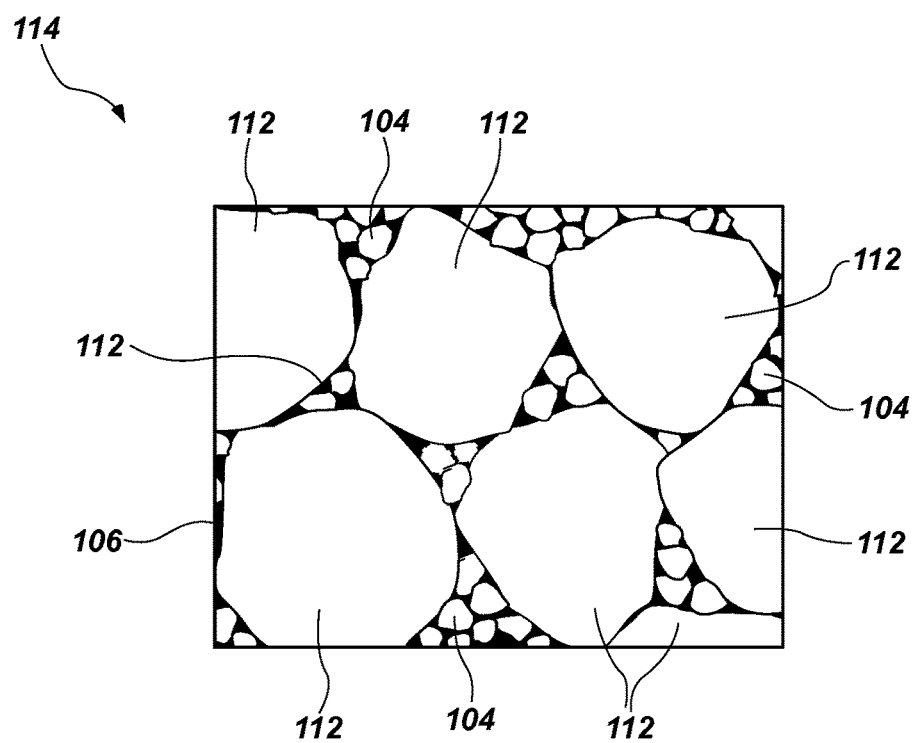
FIG. 5 is a simplified view illustrating the functionalized diamond nanoparticles and polymer of FIG. 3 mixed with diamond grit.

As shown in FIG. 5, the mixture 108 may be mixed or interspersed with relatively larger diamond particles 112 (e.g., diamond "grit") to form a second mixture 114. Alternatively, the functionalized diamond nanoparticles 104 may be mixed with the larger diamond particles 112 before adding the polymer 106. In some embodiments, the functionalized diamond nanoparticles 104, the polymer 106, and the larger diamond particles 112 may be mixed in a single operation. Thus, the second mixture 114 may include the functionalized diamond nanoparticles 104, the polymer 106, and the larger diamond particles 112. The larger diamond particles 112 may also be functionalized as described above.

As shown in FIG. 5, the second mixture 114 may include interspersed larger diamond particles 112 that from a three-dimensional network of diamond material. The larger diamond particles 112 may have average particle dimensions (e.g., mean diameters) of less than 1 mm, less than 0.1 mm, less than 0.01 mm, less than 1 µm, or even less than 0.1 µm. That is, the larger diamond particles 112 may include micron diamond particles (diamond grains in a range from about 1 µm to about 500 µm (0.5 mm)), submicron diamond particles (diamond grains in a range from about 500 nm (0.5 µm) to about 1 µm), and/or diamond nanoparticles (particles having an average particle diameter of about 500 nm or less). The larger diamond particles 112 may have a monomodal or multimodal grain size distribution.

Figure 6:
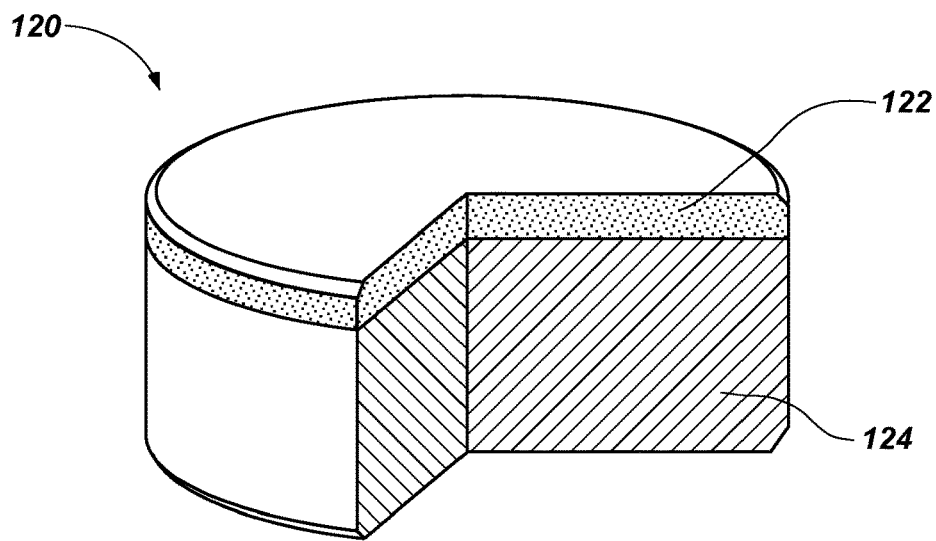
FIG. 6 is a partially cut-away perspective view of a green body, which includes a volume of a particle-polymer mixture, over a substrate.

FIG. 6 illustrates a structure 120 comprising a mixture 122 (which may be the mixture 108, shown in FIG. 3, or the second mixture 114, shown in FIG. 5) in a green or unsintered state. Optionally, the structure 120 also may include a body in the form of a substrate 124. For example, the substrate 124 may include a generally cylindrical body of cobalt-cemented tungsten carbide material, although substrates of different geometries and compositions also may be employed. The mixture 122 may be in the form of a table (i.e., a layer) on the substrate 124. The mixture 122 may be provided on (e.g., formed on or secured to) a surface of the substrate 124. In additional embodiments, the structure 120 may simply comprise a mixture 122 having any desirable shape, and may not include any substrate 124.

The mixture 122 may comprise a composite mixture formed by stacking or layering portions of mixtures described herein, such as by layering sheets 110, shown in FIG. 4, on a supporting surface, which may, in some embodiments comprise a body in the form of substrate 124. The portions of mixtures may each have the same composition, or the composition of various portions may be selected to provide any selected grain configuration. For example, an interior region of the mixture 122 may have particles with a different size distribution than an exterior region of the mixture 122. In some embodiments, the mixture 122 may be a single mass of material, without distinct layers.

The mixture 108 (FIG. 3), 114 (FIG. 5), or 122 (FIG. 6) may be sintered at high pressure and high temperature (HPHT) conditions (e.g., temperatures greater than about 900° C. and pressures greater than about 5.0 GPa) to form inter-granular bonds between adjacent functionalized diamond nanoparticles 104 or between the larger diamond particles 112 and the functionalized diamond nanoparticles 104. The sintering process may cause the interfacial chemical interaction between C—H bonds of the polymer 106 and C—F bonds of the functionalized diamond nanoparticles to result in release of hydrogen fluoride (HF), and carbon atoms of the polymer 106 bonding with, and becoming incorporated in, the grain structure of one or more of the diamond particles (e.g., functionalized diamond nanoparticles 104 or larger diamond particles 112). Without being bound to any particular theory, the carbon from the polymer 106 appears to replace the fluorine of the functionalized diamond nanoparticles 104, forming covalent bonds between adjacent grains of material in situ (see Valery A. Davydov et al., "Synergistic Effect of Fluorine and Hydrogen on Processes of Graphite and Diamond Formation from Fluorographite-Napthalene Mixtures at High Pressures," 115 J. Phys. Chem. 21000 (ACS Publications, 2011); see also Merlyn X. Pulikkathara et al., "Medium Density Polyethylene Composites with Functionalized Carbon Nanotubes," 20 Nanotechnology 195602 (IOP Publishing, 2009), the entire disclosures of each of which are hereby incorporated by reference).

During sintering, the total mass of diamond may increase due to the conversion of carbon in the polymer 106 to diamond. Thus, the overall volume occupied by polycrystalline diamond after the sintering process may be larger than the volume of polycrystalline diamond after conventional sintering of diamond nanoparticles without the fluorine coating 102 or the polymer 106.

Hydrogen atoms of the polymer 106 may form hydrogen gas ($H_2$), which may be a reducing agent. Some hydrogen gas may react with impurities or catalyst material (if present) within the mixture. Some hydrogen gas may bond to exposed particle surfaces to form hydrogen-terminated polycrystalline diamond. Pyrolysis may also form products such as aliphatic and aromatic hydrocarbons, waxes, char, etc. Some products of the pyrolysis of the polymer 106 may escape as gases during the sintering process, or may remain in the resulting structure. The pyrolysis of the polymer 106 may promote the formation of diamond-to-diamond bonds.

The polymer 106 may pyrolyze at temperatures lower than temperatures used in conventional HPHT processes. For example, a mixture containing the polymer 106 may be sintered at temperatures from about 1400° C. to about 1700° C. In some embodiments, the mixture may be sintered at a temperature from about 1300° C. to about 1450° C. or from about 1200° C. to about 1350° C. The polymer 106 may pyrolyze at temperatures below 1000° C., below 500° C., below 300° C. or even below 200° C. Different polymers 106 have different pyrolysis temperatures, and process conditions (e.g., sintering temperature, ramp rate, hold times, etc.) may be selected based on the type and amount of the polymer 106.

During the HPHT process, pressure may be applied to the mixture 108 (FIG. 3), 114 (FIG. 5), or 122 (FIG. 6), such as a pressure of at least about 5.0 GPa, at least about 6.0 GPa, at least about 8.0 GPa, or at least about 9.0 GPa.

Figure 7:
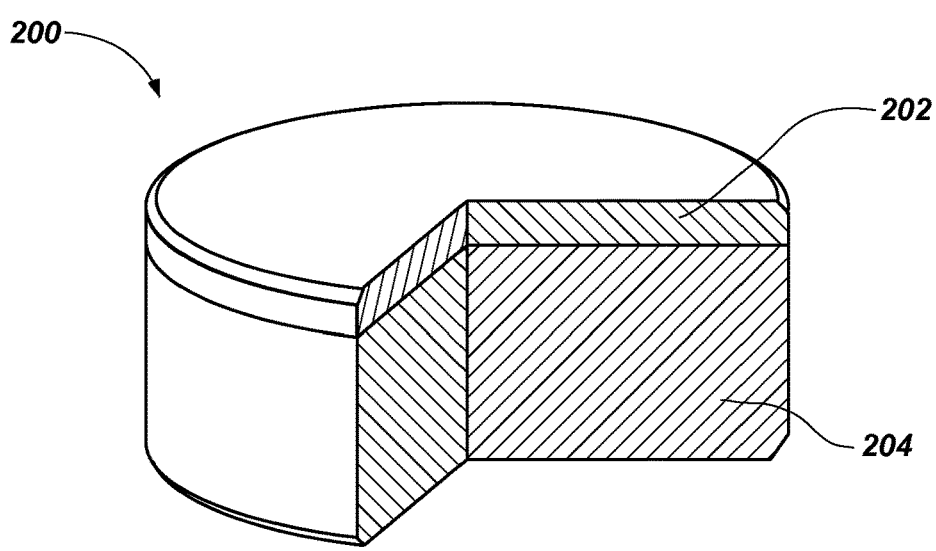
FIG. 7 is a partially cut-away perspective view of a cutting element formed by subjecting the structure of FIG. 6 to an HPHT sintering process.

FIG. 7 illustrates a cutting element 200, which may be formed by HPHT sintering of the structure 120 shown in FIG. 6. The cutting element 200 includes polycrystalline diamond 202 formed by sintering the mixture 122. Optionally, the cutting element 200 also may include a substrate 204, to which the polycrystalline diamond 202 may be bonded. For example, the substrate 204 may include a generally cylindrical body of cobalt-cemented tungsten carbide material, although substrates of different geometries and compositions also may be employed. The polycrystalline diamond 202 may be in the form of a table (i.e., a layer) of polycrystalline diamond 202 on the substrate 204. The polycrystalline diamond 202 may be provided on (e.g., formed on or secured to) a surface of the substrate 204. In additional embodiments, the cutting element 200 may simply comprise a volume of the polycrystalline diamond 202 having any desirable shape, and may not include any substrate 204. Forming a cutting element 200 by the methods described herein may result in improved inter-granular diamond-to-diamond bonding between diamond grains in the polycrystalline diamond 202 in comparison with conventional methods.

Embodiments of cutting elements 200 (FIG. 7) that include polycrystalline diamond 202 fabricated as described herein may be mounted to earth-boring tools and used to remove subterranean formation material in accordance with additional embodiments of the present disclosure. Cutting elements 200 may include residual fluorine from the process, and may exhibit a gradient in the fluorine content of the polycrystalline diamond 202. For example, a portion of the polycrystalline diamond 202 near a working surface may have a relatively higher concentration of fluorine than a portion farther from the working surface due to cobalt pushing fluorine toward the working surface during HPHT sintering.

Figure 8:
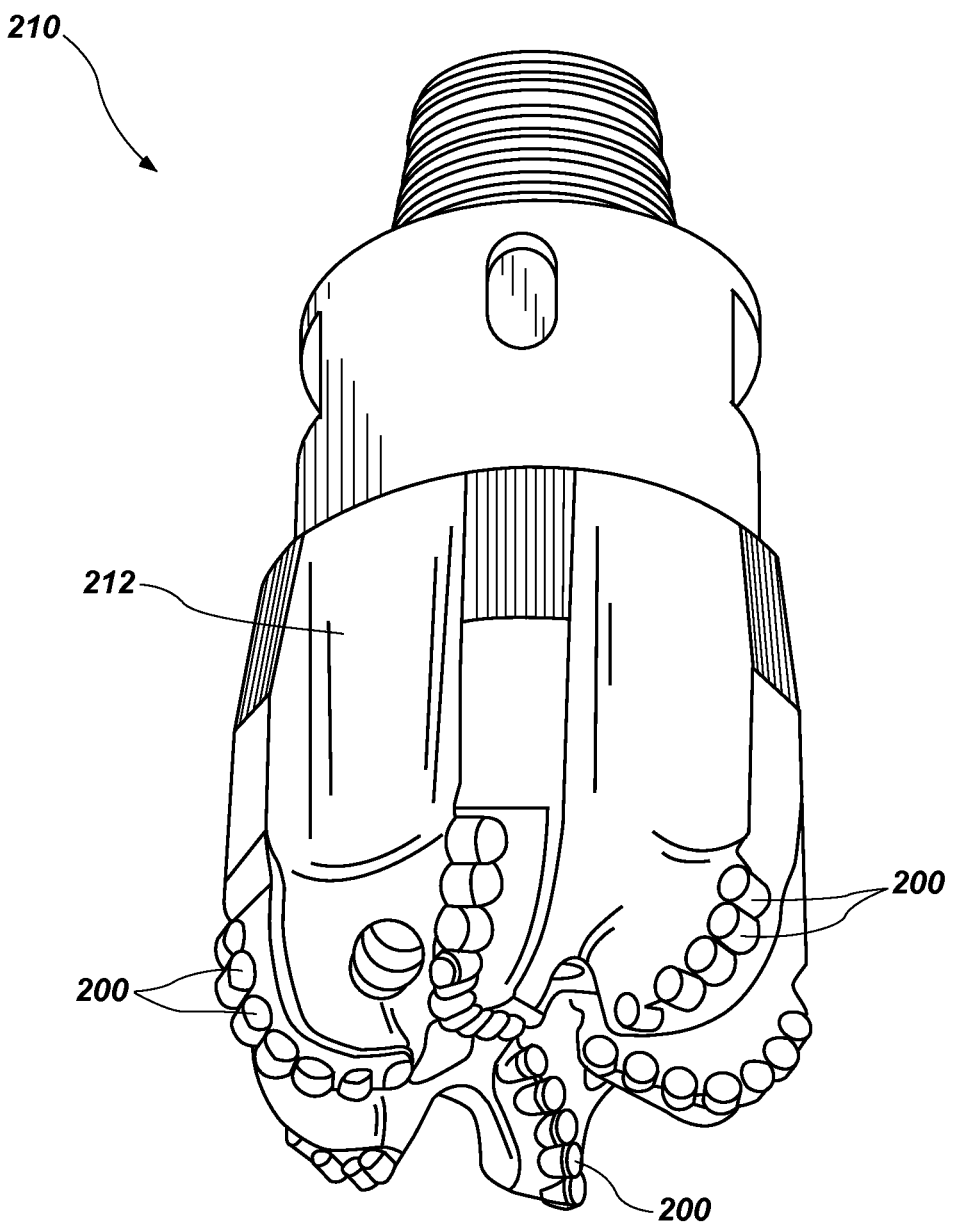
FIG. 8 illustrates a fixed-cutter earth-boring rotary drill bit including polycrystalline diamond cutting elements, such as the cutting element shown in FIG. 7.

FIG. 8 illustrates a fixed-cutter earth-boring rotary drill bit 210. The drill bit 210 includes a bit body 212. A plurality of cutting elements 200 as described herein may be mounted on the bit body 212 of the drill bit 210. The cutting elements 200 may be brazed or otherwise secured within pockets formed in the outer surface of the bit body 212, the method of attachment being somewhat related to whether or not a substrate 124 is present. Other types of earth-boring tools, such as roller cone bits, percussion bits, hybrid bits, reamers, etc., also may include cutting elements 200 as described herein.

Polycrystalline diamond formed by methods described herein may exhibit improved abrasion resistance and thermal stability. Furthermore, forming polycrystalline diamond from mixtures with polymers may be less energy-intensive than conventional processes because the polymer may pyrolyze at temperatures lower than the melting point of conventional sintering catalysts. Polymers may be relatively inexpensive and in abundant supply, and may be available as waste products of other processes.

Additional non-limiting example embodiments of the disclosure are described below.

Embodiment 1

A method of fabricating polycrystalline diamond, comprising functionalizing surfaces of diamond nanoparticles with fluorine, combining the functionalized diamond nanoparticles with a polymer to form a mixture, and subjecting the mixture to high pressure and high temperature (HPHT) conditions to form inter-granular bonds between the diamond nanoparticles.

Embodiment 2

The method of Embodiment 1, further comprising combining the functionalized diamond nanoparticles with diamond grit.

Embodiment 3

The method of Embodiment 1 or Embodiment 2, wherein combining the functionalized diamond nanoparticles with a polymer comprises combining the functionalized diamond nanoparticles with a polymer selected from the group consisting of polyethylene, polypropylene, polystyrene, polyacrylonitrile, polycarbosilane, polybutadiene, polybutylene, and acrylonitrile butadiene styrene.

Embodiment 4

The method of any of Embodiments 1 through 3, wherein combining the functionalized diamond nanoparticles with a polymer comprises mixing the functionalized diamond nanoparticles with a liquid thermoplastic polymer.

Embodiment 5

The method of any of Embodiments 1 through 4, wherein combining the functionalized diamond nanoparticles with a polymer comprises mixing the functionalized diamond nanoparticles with a plurality of particles of a solid thermoplastic polymer.

Embodiment 6

The method of any of Embodiments 1 through 5, wherein combining the functionalized diamond nanoparticles with a polymer comprises extruding the functionalized diamond nanoparticles with the polymer.

Embodiment 7

The method of any of Embodiments 1 through 6, further comprising forming the mixture into a sheet.

Embodiment 8

The method of any of Embodiments 1 through 7, wherein subjecting the mixture to HPHT conditions comprises maintaining the mixture below about 1350° C.

Embodiment 9

The method of any of Embodiments 1 through 8, wherein subjecting the mixture to the HPHT conditions comprises subjecting the mixture to a pressure of at least about 5.0 GPa.

Embodiment 10

The method of any of Embodiments 1 through 9, wherein combining the functionalized diamond nanoparticles with a polymer comprises forming a mixture in which the polymer comprises from about 0.1% to about 10.0% by weight of the mixture.

Embodiment 11

A green body comprising a plurality of diamond nanoparticles functionalized with fluorine, and a polymer material interspersed with the plurality of diamond nanoparticles.

Embodiment 12

The green body of Embodiment 11, further comprising diamond grit interspersed with the plurality of diamond nanoparticles.

Embodiment 13

The green body of Embodiment 11 or Embodiment 12, wherein the plurality of diamond nanoparticles and the polymer material comprise at least one sheet of material having a thickness from about 0.1 mm to about 10 mm.

Embodiment 14

The green body of any of Embodiments 11 through 13, wherein the polymer material comprises a material selected from the group consisting of polyethylene, polypropylene, polystyrene, polyacrylonitrile, polycarbosilane, polybutadiene, polybutylene, and acrylonitrile butadiene styrene.

Embodiment 15

The green body of any of Embodiments 11 through 14, wherein the thermoplastic polymer comprises from about 0.1% to about 10.0% by weight of the green body.

Embodiment 16

The green body of any of Embodiments 11 through 15, wherein the plurality of diamond nanoparticles has a mean diameter from about 1 nm to about 20 nm.

Embodiment 17

A method of forming cutting element, comprising functionalizing surfaces of diamond nanoparticles with fluorine, combining the functionalized diamond nanoparticles with a polymer to form a mixture, providing the mixture over a body, and subjecting the mixture and the body to high pressure and high temperature (HPHT) conditions to form inter-granular bonds between the diamond nanoparticles and secure the bonded diamond nanoparticles to the body.

Embodiment 18

The method of Embodiment 17, wherein providing the mixture over a body comprises providing sheets of the mixture over the body.

Embodiment 19

The method of Embodiment 17 or Embodiment 18, wherein subjecting the mixture and the body to HPHT conditions comprises maintaining the body below about 1350° C.

Embodiment 20

The method of any of Embodiments 17 through 19, wherein forming the mixture over a body comprises faulting the mixture over a cutting element substrate.

Embodiment 21

A cutting element formed by the methods of any of Embodiments 17 through 20.

While the present invention has been described herein with respect to certain embodiments, those of ordinary skill in the art will recognize and appreciate that it is not so limited. Rather, many additions, deletions, and modifications to the embodiments depicted and described herein may be made without departing from the scope of the invention as hereinafter claimed, and legal equivalents. In addition, features from one embodiment may be combined with features of another embodiment while still being encompassed within the scope of the invention as contemplated by the inventors. Further, the invention has utility in drill bits having different bit profiles as well as different cutter types.

What is claimed is:

1. A method of fabricating polycrystalline diamond, comprising:
   functionalizing surfaces of diamond nanoparticles with fluorine;
   combining the functionalized diamond nanoparticles with a polymer to form a mixture;
   forming the mixture comprising the functionalized diamond nanoparticles and the polymer into a sheet, the sheet comprising the functionalized diamond nanoparticles dispersed within the polymer; and
   subjecting the sheet comprising the functionalized diamond nanoparticles dispersed within the polymer to high pressure and high temperature (HPHT) conditions to form inter-granular bonds between the diamond nanoparticles, wherein carbon atoms of the polymer bond with one or more of the diamond nanoparticles to promote formation of the inter-granular bonds between the diamond nanoparticles.

2. The method of claim 1, further comprising combining the functionalized diamond nanoparticles with diamond grit.

3. The method of claim 1, wherein combining the functionalized diamond nanoparticles with a polymer comprises combining the functionalized diamond nanoparticles with a polymer selected from the group consisting of polyethylene, polypropylene, polystyrene, polyacrylonitrile, polycarbosilane, polybutadiene, polybutylene, and acrylonitrile butadiene styrene.

4. The method of claim 1, wherein combining the functionalized diamond nanoparticles with a polymer comprises mixing the functionalized diamond nanoparticles with a liquid thermoplastic polymer.

5. The method of claim 1, wherein combining the functionalized diamond nanoparticles with a polymer comprises mixing the functionalized diamond nanoparticles with a plurality of particles of a solid thermoplastic polymer.

6. The method of claim 1, wherein forming the mixture comprising the functionalized diamond nanoparticles and the polymer into a sheet comprises extruding the functionalized diamond nanoparticles with the polymer.

7. The method of claim 1, wherein subjecting the sheet comprising the functionalized diamond nanoparticles dispersed within the polymer to HPHT conditions comprises maintaining the sheet comprising the functionalized diamond nanoparticles dispersed within the polymer below about 1350° C.

8. The method of claim 1, wherein subjecting the sheet comprising the functionalized diamond nanoparticles dispersed within the polymer to the HPHT conditions comprises subjecting the sheet comprising the functionalized diamond nanoparticles dispersed within the polymer to a pressure of at least about 5.0 GPa.

9. The method of claim 1, wherein combining the functionalized diamond nanoparticles with a polymer comprises forming a mixture in which the polymer comprises from about 0.1% to about 10.0% by weight of the mixture.

10. A method of forming a cutting element comprising polycrystalline diamond, comprising polycrystalline diamond, comprising: functionalizing surfaces of diamond nanoparticles with fluorine; combining the functionalized diamond nanoparticles with a polymer to form a mixture; forming the mixture comprising the functionalized diamond nanoparticles and the polymer into a sheet, the sheet comprising the functionalized diamond nanoparticles dispersed within the polymer; providing the sheet comprising functionalized diamond nanoparticles dispersed within the polymer over a body; and subjecting the sheet comprising functionalized diamond nanoparticles dispersed within the polymer and the body to high pressure and high temperature (HPHT) conditions to form inter-granular bonds between the diamond nanoparticles and secure the bonded diamond nanoparticles to the body, wherein carbon atoms of the polymer bond with one or more of the diamond nanoparticles to promote formation of the inter-granular bonds between the diamond nanoparticles.

11. The method of claim 10, wherein providing the sheet over a body comprises providing a plurality of sheets of the mixture over the body.

12. The method of claim 10, wherein subjecting the sheet and the body to HPHT conditions comprises maintaining the body below about 1350° C.

13. The method of claim 10, wherein providing the sheet over a body comprises providing the sheet over a cutting element substrate.

14. The method of claim 1, wherein combining the functionalized diamond nanoparticles with the polymer comprises mechanically mixing the functionalized diamond nanoparticles with a powder of the polymer.

15. The method of claim 1, wherein forming the mixture comprising the functionalized diamond nanoparticles and the polymer into a sheet combining the functionalized diamond nanoparticles with the polymer comprises filling spaces between the functionalized diamond nanoparticles with the polymer.

16. The method of claim 1, wherein forming the mixture comprising the functionalized diamond nanoparticles and the polymer into a sheet comprises forming the mixture into a plurality of sheets.

17. The method of claim 16, wherein forming the mixture into a plurality of sheets comprises forming the mixture into a plurality of sheets having different compositions.

18. The method of claim 1, wherein forming the mixture comprising the functionalized diamond nanoparticles and the polymer into a sheet comprises heating the mixture of the functionalized diamond nanoparticles and polymer to liquefy the polymer.

* * * * *

UNITED STATES PATENT AND TRADEMARK OFFICE
CERTIFICATE OF CORRECTION

PATENT NO. : 10,167,674 B2  
APPLICATION NO. : 13/782341  
DATED : January 1, 2019  
INVENTOR(S) : Valery N. Khabashesku, Anthony A. DiGiovanni and Gaurav Agrawal Page 1 of 1

It is certified that error appears in the above-identified patent and that said Letters Patent is hereby corrected as shown below:

In the Specification

| | | |
|---|---|---|
| Column 4, | Line 50, | change "bosilane (PCS) etc." to --bosilane (PCS), etc.-- |
| Column 6, | Line 21, | change "that from a" to --that form a-- |
| Column 10, | Line 51, | change "body comprises faulting" to --body comprises forming-- |

In the Claims

| | | |
|---|---|---|
| Claim 10, | Column 12, | Lines 6,7 | change "polycrystalline diamond, comprising polycrystalline diamond, comprising:" to --polycrystalline diamond, comprising:-- |

Signed and Sealed this  
Fifth Day of February, 2019

Andrei Iancu  
*Director of the United States Patent and Trademark Office*